United States Patent
LeVier et al.

(10) Patent No.: US 8,208,161 B2
(45) Date of Patent: Jun. 26, 2012

(54) PHOTO PRINTING DEVICE

(75) Inventors: Craig A LeVier, Escondido, CA (US);
Timothy J Carlin, San Diego, CA (US);
Anton Tabar, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 610 days.

(21) Appl. No.: 12/251,737

(22) Filed: Oct. 15, 2008

(65) Prior Publication Data

US 2010/0091321 A1    Apr. 15, 2010

(51) Int. Cl.
*G06F 15/00* (2006.01)

(52) U.S. Cl. ....... 358/1.15; 271/287; 271/290; 271/292; 271/295

(58) Field of Classification Search .......... None
See application file for complete search history.

(56) References Cited

U.S. PATENT DOCUMENTS

| | | | |
|---|---|---|---|
| 618,846 A * | 2/1899 | Crowder | 232/25 |
| 3,851,872 A * | 12/1974 | Gerbasi | 271/291 |
| 4,326,815 A * | 4/1982 | Kapp | 400/625 |
| 4,501,419 A * | 2/1985 | Takahashi et al. | 271/288 |
| 4,608,923 A * | 9/1986 | Muller | 101/91 |
| 4,619,452 A * | 10/1986 | Euteneuer et al. | 271/305 |
| 5,308,058 A * | 5/1994 | Mandel et al. | 271/289 |
| 5,316,734 A * | 5/1994 | Yamaguchi | 422/135 |
| 5,401,092 A * | 3/1995 | Ady | 312/223.2 |
| 5,551,686 A * | 9/1996 | Sanchez et al. | 271/298 |
| 5,556,087 A | 9/1996 | Gosslinghoff | |
| 5,649,260 A | 7/1997 | Wheeler et al. | |
| 5,794,789 A * | 8/1998 | Payson et al. | 209/549 |
| 6,157,436 A | 12/2000 | Cok | |
| 6,282,373 B1 | 8/2001 | Glogovsky et al. | |
| 6,354,590 B1 | 3/2002 | Payne | |
| 6,480,673 B2 | 11/2002 | Liebenow | |
| 6,546,313 B2 * | 4/2003 | Nakahira et al. | 700/224 |
| 6,707,531 B2 | 3/2004 | Crasnianski et al. | |
| 6,727,973 B2 | 4/2004 | Mizumo | |
| 6,765,646 B2 | 7/2004 | Oka et al. | |
| 6,915,071 B2 | 7/2005 | Maekawa et al. | |
| 6,985,673 B2 * | 1/2006 | Molldrem, Jr. | 396/2 |
| 7,016,059 B1 | 3/2006 | Baum et al. | |
| 7,098,942 B1 | 8/2006 | Nihei | |
| 2002/0177922 A1* | 11/2002 | Bloom | 700/213 |
| 2003/0128343 A1* | 7/2003 | Crasnianski et al. | 355/40 |
| 2005/0190400 A1* | 9/2005 | Redd et al. | 358/1.15 |
| 2005/0264832 A1* | 12/2005 | Baum et al. | 358/1.2 |
| 2010/0025509 A1* | 2/2010 | Matlin et al. | 241/100 |
| 2010/0052338 A1* | 3/2010 | Osvatic et al. | 292/216 |

FOREIGN PATENT DOCUMENTS

GB    2356278    5/2001

* cited by examiner

*Primary Examiner* — Twyler Haskins
*Assistant Examiner* — Helen Q Zong

(57) ABSTRACT

A photo printing device includes a microprocessor, operable to receive photo printing data, a printer, configured to print photographs from the photo printing data, an order sorter, having a plurality of moveable bins for receiving prints from the printer, and means for conveying information to a user related to operation of the order sorter.

19 Claims, 6 Drawing Sheets

PHOTO PRINTING DEVICE

BACKGROUND

The rise of digital photography in recent years has prompted a number of changes in the photo finishing and photo printing industry. While traditional photographic film is developed via a chemical process that is generally performed by trained personnel at specialized photo processing centers, high quality photographic prints can now be produced from digital images using less expensive ink jet printing systems.

Even with these developments, retail photo printing establishments are still often used to obtain prints from digital photographic data. In one type of operation, the photo printing equipment is operated by retail store workers, who obtain digital photo information from customers, then provide the prints to the customer upon completion, in exchange for payment. On the other hand, self-service retail photo printing systems have also been developed, including stand-alone photo printing kiosks. These self-service devices allow a user to download digital photographic data, either directly or via a computer network (such as the Internet), pay electronically (e.g. via credit card), and then wait or return later to retrieve their prints. These systems involve relatively little supervision or oversight from an employee or worker.

One challenge associated with commercial digital photo printing systems, whether operated by retail personnel or in a self-service configuration, is the sorting of orders for customers. Self-service or "front-of-counter" printing devices typically have only one exposed and unsecured print job bin. This configuration can require the user to download data, then wait at that location to retrieve their prints immediately. "Behind-the-counter" digital photo printing systems typically include a collator or order sorting device with multiple output positions. These order sorting systems can be passive and primitive devices, often consisting of a number of plastic paddles or trays. With these devices the burden of sorting and organizing orders falls heavily on a store employee and systematic use of the machine. New employees with limited training are prone to making order sorting mistakes. Behind-the-counter collators rely on order information printed on the output and a trained employee to organize multiple jobs. While this may be simple and effective for experienced employees, new or distracted store personnel are prone to order sorting mistakes. This is particularly significant in an industry in which employee turnover is relatively high.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
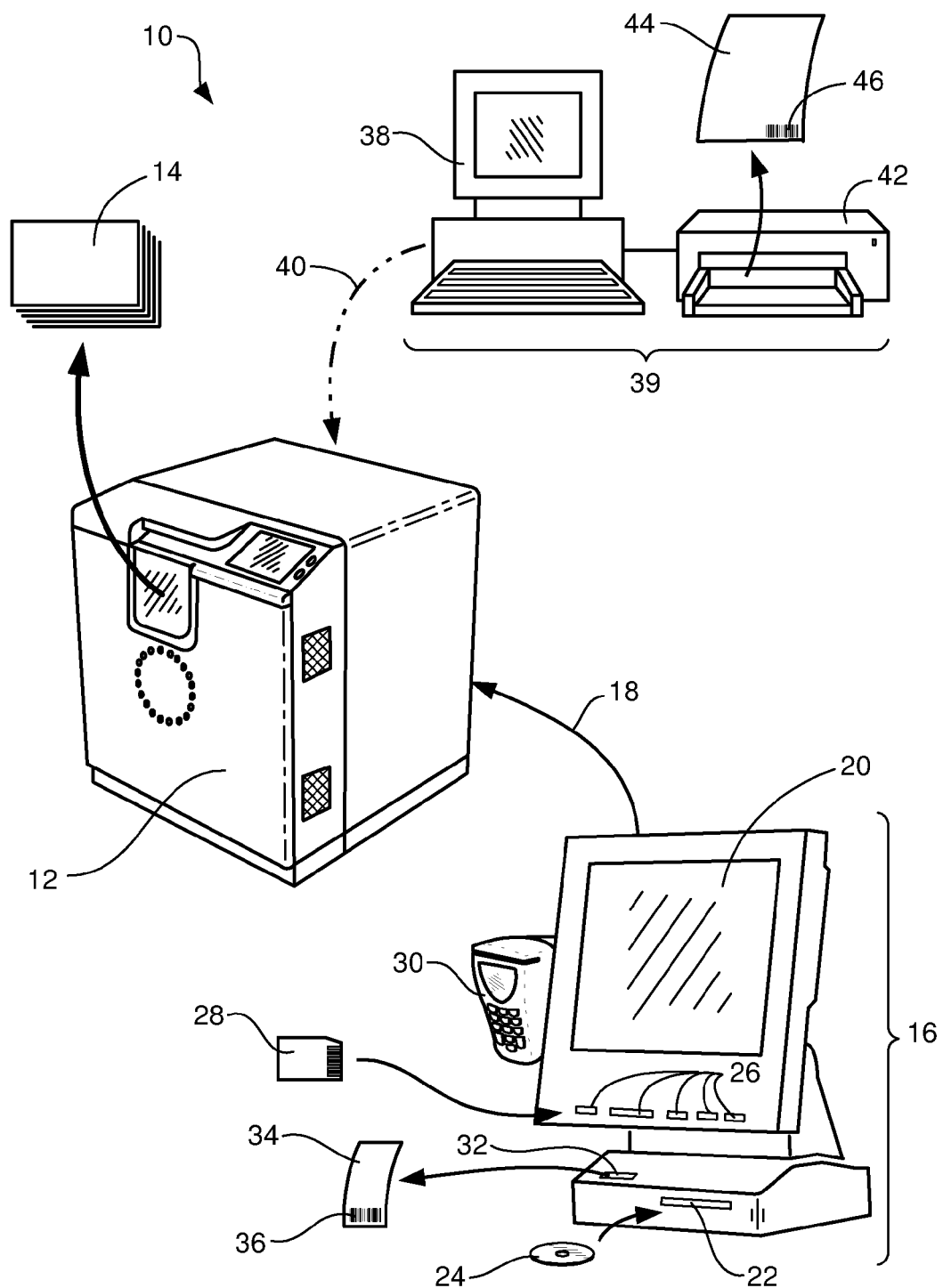
FIG. 1 is a perspective view of an embodiment of a photo printing system including a photo printing device and multiple input terminals.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, directional terms, such as "top," "bottom," "front," "back," "leading," "trailing," etc, are used with reference to the orientation of the figures being described. Because components of various embodiments disclosed herein can be positioned in a number of different orientations, the directional terminology is used for illustrative purposes only, and is not intended to be limiting.

As noted above, even with recent advancements in digital photography, many digital camera users still use retail photo printing establishments to obtain prints from digital photographic data. Shown in FIG. 1 is one embodiment of a retail photo printing system 10 that includes a compact photo printing device 12. This photo printing device is suitable to be presented in a retail setting, such as in a photographic shop or other storefront location. The photo printing device produces photographic prints 14 based on digital data that can be received from a variety of sources. As shown in FIG. 1, a retail input station 16 can be in communication with the photo printing device 12, as indicated by communications line 18, whether through a hard-wired connection or via a communications network (e.g. a LAN or the Internet).

One or more input stations can be associated with the printing device 12. Likewise, multiple printing devices can be associated with a given input station or group of input stations. The retail input station 16 is a type of input station that can be provided in the same retail setting as the printer device, or it can be in some other location. The retail input station can include a touchscreen display 20 for interaction with a user, and various data input devices for receiving digital media, such as a CD/DVD drive 22 for receiving a CD or DVD disk 24, and one or more flash memory card slots 26, configured for receiving a flash memory card 28. The flash memory slots can be configured to receive any of the various types and sizes of flash memory cards.

The retail input station 16 can also include a pin pad device 30 for allowing a customer to swipe a credit or debit card or the like to pay for photo printing services. When a customer brings digital media to be printed, the customer inserts the digital media into one of the input devices, then enters identifying and other information into the input station using the touchscreen 20, as directed by instructions on the display. This information can include identification of the desired image files to print (from the digital media device), print size, number of copies and other alternatives. The input terminal can also include editing or other software with which a user can manipulate or modify images, if desired. The user can then select a payment method and make the corresponding payment.

The input station 16 can include a receipt printer 32 (e.g. a thermal printer), which prints a receipt 34 for the customer upon confirmation of the transaction. This receipt can include all important information about the print job, including an estimated time of completion of the requested printing, and a unique bar code 36 that identifies the customer's print job. At that point the image data for the print job is transmitted to the printer 12, and printing can commence.

As an alternative to the retail input station 16, a customer's home computer 38 or other computer terminal in a remote location can be a remote input station 39. For example, using an online print website, the customer can load photographic files from the user's home computer (or other remote terminal) to the retail printing device 12 via a network, such as the Internet, indicated by communication line 40. This avoids the need for a user to physically transport a digital media device (e.g. flash memory card, CD, etc.) to a retail photo printing location. It can also reduce waiting time for the user at the retail site, since the photographic files can be sent a sufficient time before the user travels to the retail site to obtain the prints. When submitting photographic image files in this way, the user can use their own printer device 42 (e.g. home inkjet or laser printer) to print a receipt 44 with a corresponding barcode 46, comparable to the receipt 34 that is provided at the retail input station 16.

Figure 2:
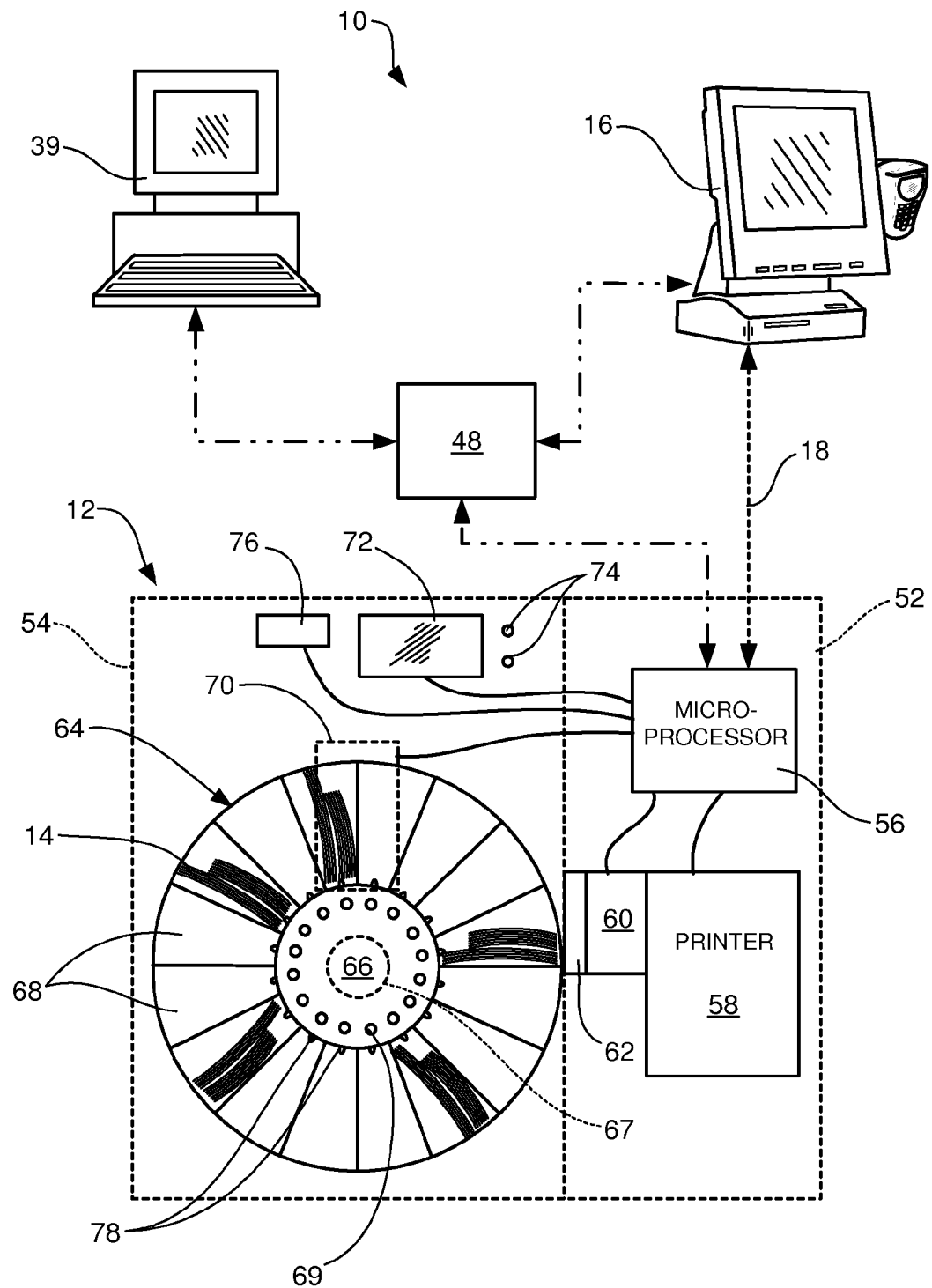
FIG. 2 is a schematic diagram of a photo printing system like that of FIG. 1, and showing the internal components of an embodiment of a photo printing device having a comprehensive system for identifying and retrieving orders and a rotational order sorter.

A schematic diagram of a printing system 10 and printer 12 like that shown in FIG. 1 is provided in FIG. 2. In this figure, a retail input station 16 and remote input station 39 are in communication with a network 48, which is in communication with the printer device 12. This network can represent any number of network components or steps that allow communication between the respective devices, such as the Internet, a local area network (LAN), etc. Additionally, as indicated by communication line 18, a retail input station 16 can be connected directly to the printer device 12, such as by a hard-wired connection, rather than via the network 48. The communication lines shown in FIG. 2 have arrows pointing in both directions, indicating that communications can flow in both directions if desired, such as for order and printing confirmation feedback to an input station. However, the system can be configured so that communication is only one-way from the input stations to the printer device.

The printing device 12 is divided into two general parts: a printer unit 52 and an order sorter unit 54. The printer unit generally includes a microprocessor 56, which drives a printer 58 (e.g. an ink jet printer) that prints photographs. It will be understood that the printer includes a paper supply and paper handling devices, though these are not shown. The printer can be configured to print photographs of multiple sizes, such as both 4"×6" and 5"×7" prints, for example. Finished prints 14 from the printer 58 are discharged to and collected in an escrow bin 60 until a complete order or batch is printed, or until the maximum quantity of prints that can fit in a single bin of the order sorter are printed. The escrow bin also includes an escrow transfer mechanism 62, for transferring a complete batch of prints to a single order sorter bin.

The order sorter unit 54 includes an order sorter wheel 64 that rotates around a central hub 66. A drive motor and transmission 67 for the order sorter wheel are positioned within the wheel hub 66. The drive motor and transmission can be bi-directional, so that the order sorter wheel can rotate in both directions. The order sorter wheel includes a plurality of order sorter bins 68 that are radially located on the wheel and configured to hold completed batches of prints that are transferred to it from the escrow bin 60 at the three o'clock position. A circle of indicator lights 69 (e.g. LED's) are provided on the wheel hub 66, one light for each order sorter bin. These lights are controlled by the microprocessor 56, and can be used to help identify and retrieve print orders, as described in more detail below. While the embodiment of the order sorter wheel shown herein includes eighteen bins, it is to be appreciated that the number of bins on a rotational order sorter can vary, depending on the size of the bins and the size of the wheel. Once prints are transferred to an order sorter bin, the order sorter wheel can rotate that bin to the twelve o'clock position adjacent to an output door 70 for removal.

The order sorter unit 54 also includes a display screen 72 (e.g. an LCD touch screen), for allowing data input, control and interaction with a user. It will be apparent that other data input and control devices could also be used. Adjacent to the display screen are a pair of printer state LEDs 74. These can operate in conjunction with the display to provide status and operational information for the printer. For instance, a green light can indicate power to the system. A blinking green light can mean the device is printing. An amber light can indicate that the machine needs some attention, such as when supplies are low. A red light can indicate a system error. These printer state LEDs can help improve the overall user experience and can help provide information to an operator or user from a distance.

To the left of the touch screen display 72 is a barcode reader 76 for reading a barcode (36 in FIG. 1) on a print job receipt (34 in FIG. 1), as discussed above. The barcode reader provides an order identifying data input device, though other order identifying data input devices can also be used. The display 72, printer state LEDs 74, barcode reader 76 and output door 70 are interconnected to and controlled by the microprocessor 56. While the display, indicator lights and barcode reader are shown as being physically part of the order sorter unit 54, these components could alternatively be made part of the printer unit 52.

When a customer comes to retrieve prints that have been printed, the customer inserts their barcode receipt (34 in FIG. 1) beneath the barcode reader 76, causing the system to identify the respective print order. The system can then provide instructions or other graphical indicia (e.g. words, symbols, pictures, etc.) to the customer on the display 72 if needed, rotate the order sorter wheel 64 to place the appropriate order sorter bin 68 adjacent to the output door 70, and unlock the door, so that the user can obtain the prints.

The escrow bin 60 and escrow transfer mechanism 62 act as an intermediary between the printer 58 and the order sorter wheel 64. The escrow bin enables continuous printing and print collection independent of wheel motion. Print jobs can be collected without disturbing the cycle time of the printer.

The escrow bin 60 can have substantially the same capacity as each of the sorter bins 68 (e.g. 80 prints), so that each can contain an order of a given maximum size. The sorter bins can also each include a sensor 78 (e.g. an optical sensor) for detecting the presence or absence of prints therein. Once an order is filled or the escrow bin 60 is full, the escrow transfer mechanism 62 transfers the finished prints 14 to a sorter bin 68 that is positioned adjacent to the escrow transfer mechanism (i.e. at the 3 o'clock position). The rotational order sorter wheel 64 rotates under the control of the microprocessor 56 to place an empty sorter bin adjacent to the escrow transfer mechanism when a batch of prints are ready. Because the order sorter wheel is bi-directional and the sensors 78 indicate any empty bin, the order sorter wheel can move the shortest distance to place any empty bin in position to receive finished prints from the escrow bin.

Figure 3:
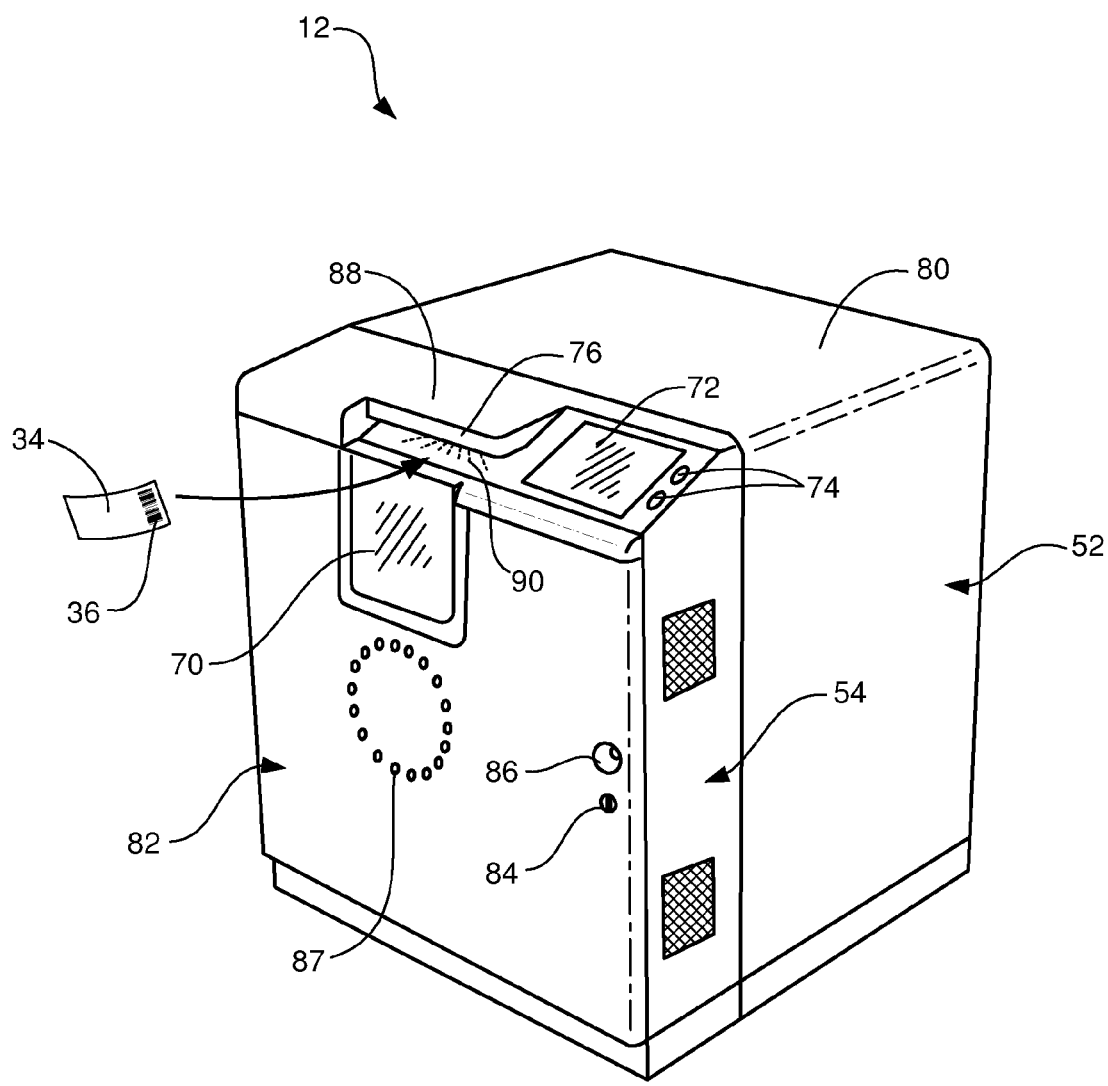
FIG. 3 is a front perspective view of one embodiment of a photo printing device having a comprehensive system for identifying and retrieving orders, the device being configured in a front-of-counter or self-service mode.

A front perspective view of one embodiment of the photo printing device 12 is provided in FIG. 3. As noted above, the printing device 12 generally includes a printer unit 52 and an order sorter unit 54. The printer unit is encased in an outer housing 80, to which the order sorter unit 54 mates. A front door 82, also called an order security door, with a lock 84 (e.g. a key lock) and lock access hole 86 is hingedly connected to the front of the order sorter. The lock 84 locks the front door to the order sorter unit 54, and the lock access hole provides access to another lock that locks the order sorter unit 54 to the printer base unit 52. In this embodiment the output door 70 is incorporated into the front door 82.

The front door 82 includes a group of lenses or windows 87 that are arranged in a circle, and which transmit light from the indicator lights 69 that are on the hub 66 of the order sorter wheel (64 in FIG. 2), which is concealed behind the front door 82.

The touch screen display 72 is located above the front door 82 in the top of the order sorter unit 54, with the printer state LEDs 74 to the right, and the barcode reader 76 to the left in an overhang 88. The barcode reader provides a downward light beam (indicated by dashed lines 90) beneath the overhang for reading a barcode 36 on a print job receipt 34. When a customer comes to retrieve prints, the customer can simply insert the barcode beneath the overhang into the path of the light beam of the barcode reader to initiate print retrieval.

Figure 4:
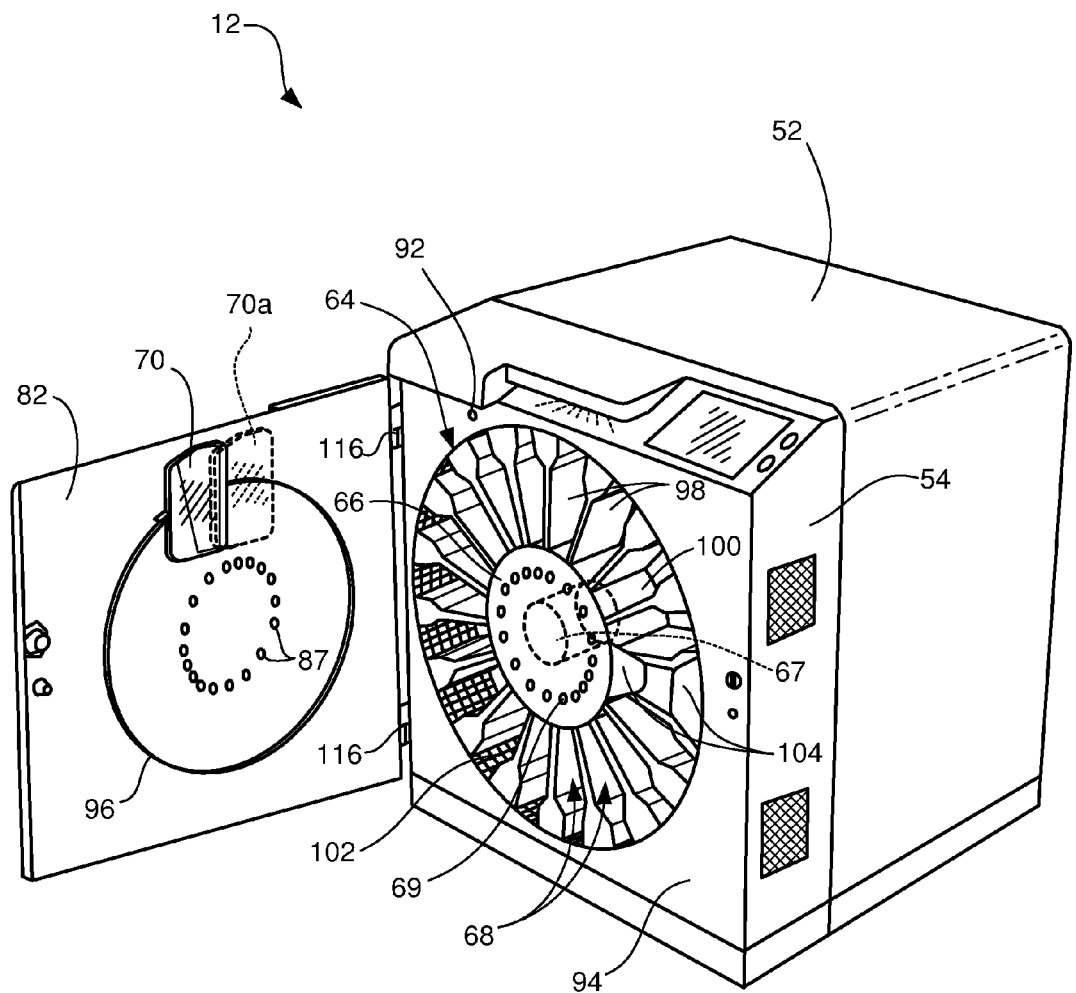
FIG. 4 is a front perspective view of the photo printing device of FIG. 3 having the front security door open, exposing the rotational order sorter.

The front door 82 can be opened for access to the rotational order sorter wheel 64 as shown in FIG. 4. This view also shows the inside of the front door, showing the transparent output door 70, which can slide from a closed position, shown in solid lines, to an open position, shown in dashed lines at 70a, allowing access to prints. The output door can be a transparent sliding door that is spring-loaded, similar to doors used on sandwich vending machines and the like. An output door solenoid lock device 92 can be included in the front face 94 of the order sorter unit 54. This solenoid lock device can extend or retract under control of the microprocessor (56 in FIG. 2) to lock or unlock the output door. In the locked position, a pin extends from the front of the order sorter unit to block the back edge of the output door, preventing it from being opened to the position 70a. When a user is authorized to obtain prints, the solenoid retracts, allowing the user to open the output door. The solenoid can also hold the door in the open position while the user obtains the desired prints. Once the sensor 78 in the respective order sorter bin recognizes that all prints have been removed from that bin, the solenoid lock can release, allowing the output door to close under the force of the spring. The front door also includes the circular group of lenses or windows 87 mentioned above, and a registration ring 96 that protrudes into a notch in each bin 68 of the order sorter wheel, for the purpose of justifying or registering the prints in their respective bins while the wheel turns. This registration ring keeps prints from catching an edge and getting jammed between the order sorter wheel and the front or order security door. One or more additional registration rings can be provided behind the order sorter wheel to keep prints from getting stuck between the wheel and the rear frame.

As described above, the rotational order sorter wheel 64 includes multiple storage bins 68 that are arranged around the central hub 66. Given the circular shape of the order sorter wheel, the bins each have a wedge shape, and are defined by radial walls 98 that separate adjacent bins, an inner wall 100 adjacent to the hub, and an outer wall 102 at the outer perimeter of the order sorter wheel. As shown in FIG. 4, the outer wall 102 of the order sorter wheel can be a mesh or grating type of material with holes that allow paper dust and other debris that otherwise might typically stay in an output tray to naturally fall out as the wheel rotates, providing a self-cleaning feature. A pair of flexible plastic flaps or keepers 104 can be positioned to extend across the front of the order sorter wheel at the output bin location to help prevent prints from being pushed out too far on initial ejection from the printer and into a bin of the order sorter.

The rotational order sorter allows the photo printing device to maximize available space for print orders in a small machine volume. This is done in several ways. First, the rotational axis of the order sorter wheel 64 is horizontal, so that the wheel rotates in a vertical plane. This helps minimize the space required for this device. Additionally, the motor and transmission 67 that drive the order sorter wheel 64 can be disposed entirely within the wheel hub 66. This feature helps to maximize available space for print orders in a small machine volume by using space that otherwise might go unused.

The size of the order sorter bins 68 also helps to maximize available space for print orders in a small machine volume. The diameter and thickness of the order sorter wheel 64 are related to the size of prints to be stored therein. The depth of the order sorter wheel (i.e. the dimension from front to back) and of the order sorter unit 54 can be just larger than the width of the largest prints to be stored therein. For example, where 5"×7" photo prints are the largest that will be printed, each bin of the order sorter can be just larger than 7" long and 5" deep, so as to accommodate these prints with their long dimension aligned radially with respect to the wheel 64. In such a case, the thickness of the wheel will be just greater than 5", and the diameter of the wheel will be about twice the length of the maximum print size to be produced by the printer, plus the diameter of the central hub 66. Thus with 5"×7" prints, each bin of the order sorter will have a length that is some amount greater than 7", and the total diameter of the wheel will be equal to two times the length of an order sorter, plus the diameter of the central hub.

Figure 6:
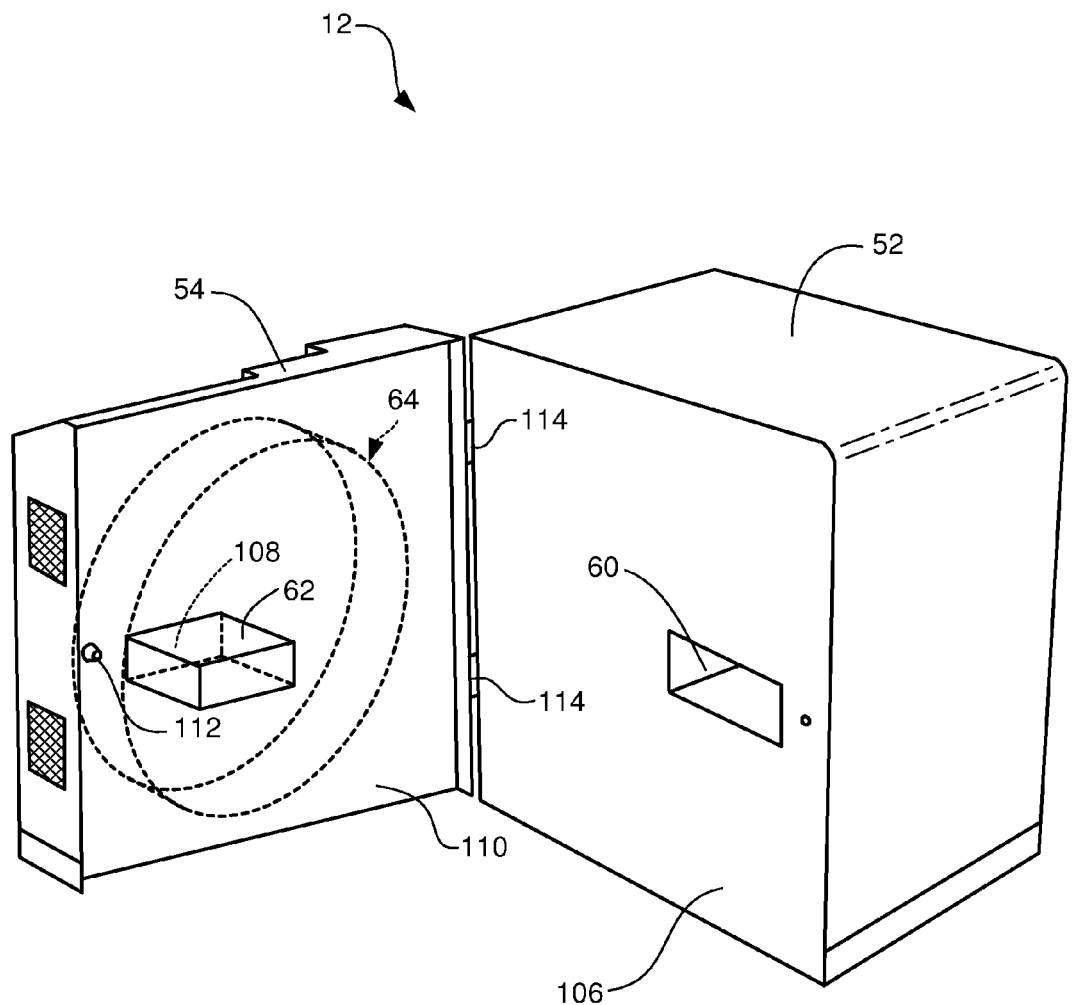
FIG. 6 is a front perspective view of the photo printing device of FIG. 3 having the order sorter door open to expose the interface between the order sorter and the print transfer system.

The order sorter unit 54 can be hingedly mounted to the printer base unit 52, as shown in FIG. 6, and effectively operate as a front door to the printer base unit. This is useful for gaining access to the components of the printer base unit for maintenance, repair, etc. In this view the escrow bin 60 and an embodiment of the escrow transfer mechanism 62 are visible at the 3 o'clock location relative to the rotation of the order sorter wheel 64, when viewed from the front. In this embodiment the escrow transfer mechanism is attached to the back of the order sorter unit, and is configured to mate with the escrow bin when the order sorter unit is closed against the base unit, though this is only one possible configuration. The escrow transfer mechanism could alternatively be attached to the printer (58 in FIG. 2), as part of the base unit. An escrow transfer opening 108 is positioned in a corresponding location in the back wall 110 of the order sorter unit 54, to allow prints to be physically transferred from the escrow bin to a bin of the order sorter wheel 64 (shown in dashed outline). A lock 112 for the order sorter unit and hinges 114 are also visible in this view. In this view it can be seen that the order sorter wheel 64 has a volume that is almost the same as the volume of the front door of the base printer. The diameter of the wheel is only slightly smaller than the height and width of the front of the base printing device.

Referring to FIG. 4, the front or order security door 82 of the printer device 12 can be mounted on lift-off hinges 116, allowing it to be completely removable, giving the printing device two distinct operating modes. In a first mode, with the front door in place, as in FIG. 3, users are limited to obtaining prints through the single output door 70. This is a front-of-counter or self-service mode, in which customers operate the machine. Restriction to a single output bin with a locking door helps prevent one customer from obtaining another customer's prints, or from obtaining prints without payment. Additionally, a customer's prints can remain safely in the printer device for any length of time until the customer retrieves them.

Figure 5:
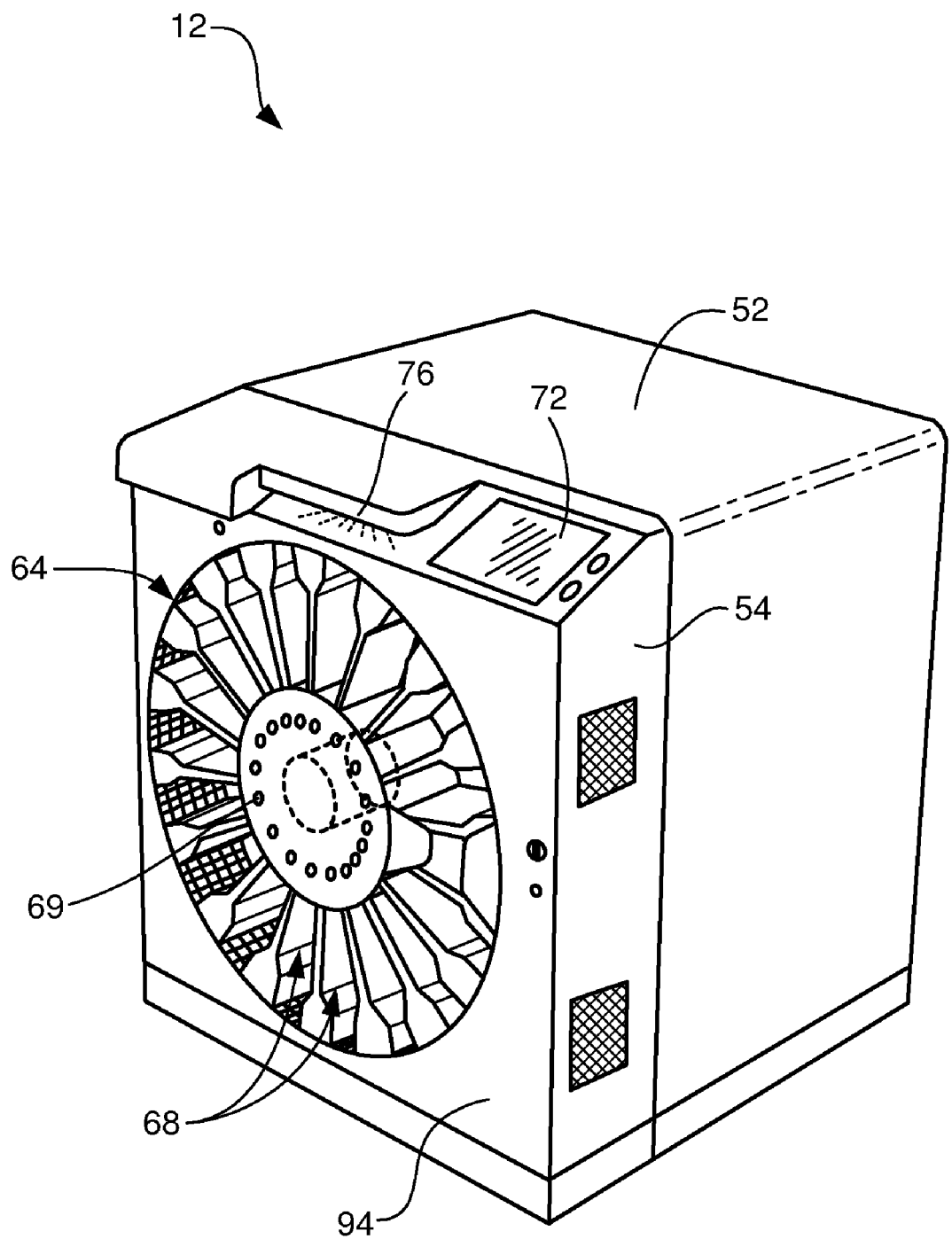
FIG. 5 is a front perspective view of the photo printing device of FIG. 3 having the front security door removed for a behind-the-counter operational mode.

In a second behind-the-counter mode, with the front door removed, as shown in FIG. 5, a user can gain access to all bins 68 of the order sorter wheel 64, rather than being limited to just a single output bin. In the behind-the-counter mode an attendant can retrieve prints from any sorter bin whenever desired, and deliver them to a customer or place them in another order storage location. The sensors (78 in FIG. 2) in the sorter bins allow the system to know when a bin is empty.

Advantageously, the rotational order sorter allows any empty bin to be used for any print job, regardless of the order in which batches are printed or retrieved. The order sorter can rotate in any direction to any position as needed, whether to receive a new batch of prints from the escrow bin (assuming at least one order sorter bin 68 is empty) or to discharge a batch to a user. The order of use of the bins is thus independent of the order of printing. The rotational order sorter is simple and compact which is desirable where floor space is at a premium, as is the case in many retail establishments. The circular layout of the order sorter wheel creates a high density of print job bins and the mechanisms required to drive them.

This order sorter provides flexibility to the user and machine to fill and retrieve print orders in any sequence. Orders can be retrieved in any order to match the timing and demands of different customers, while allowing other orders to remain in the machine until requested. This frees up retail space requirements by minimizing the need for an order overflow area. Since print jobs do not need to be processed in a systematic order, a new job can be loaded into the wheel at any location for added efficiency. The rotational order sorter also offers efficient movement of print jobs to an ideal retrieval location, and imposes no limitation on time a given order can remain in the machine. If a customer chooses not to retrieve their order for several days, the order can remain safely in the machine and not need to be removed in a systematic way simply to access another order.

However, a user of this device in the behind-the-counter mode, in which the face of the order sorter wheel 64 is exposed, is not restricted from retrieving jobs from any or all bin locations at once. This allows an attendant to remove print jobs from the order sorter wheel when all bins become full, thus allowing the printer device to continue to print when it would otherwise have to wait for customers to retrieve orders.

The photo printing device disclosed herein also includes a system for identifying and retrieving print orders. The operation of the order sorter indicator lights 69 that are provided on the order sorter wheel hub 66 is integrated with the display screen 72, the barcode scanner 76 and the order sorter bin sensors 78 to assist a user in identification and retrieval of orders from the order sorter wheel 64, whether in the front-of-counter mode, or in the behind-the-counter mode. The elements of this system act differently and are tuned to the needs and work flow for both distinct modes of the machine— both front-of-counter (unattended) mode and behind-the-counter mode.

The touch screen display 72 mounted on the top of the device initiates the use experience by continuously displaying graphics about the machine and animation about how to get started retrieving a print job. The display directs the user to scan the barcode on the receipt they received when submitting their print order. The scanned barcode is interpreted by the printing device and makes a link between the customer and the specific print job.

In front-of-counter mode, the front door 82 covers the numerous order sorter bins 68 that would be exposed to a behind-the-counter employee. However, the elements of the system work together to guide the user to their prints. Customers first scan the barcode receipt that they received when submitting their order at an input station (e.g. as directed by the words and animation on the integrated display 72). A continuously-on, red bar projected by the barcode scanner 76 can be used to indicate the proper position to present the barcode.

The microprocessor of the printer device then senses the correct order and rotates the order sorting wheel 64 such that the appropriate bin moves to the retrieval location at the output door. The output door will then unlock allowing access to the print job. Sensors recognize when the prints have been removed from the output bin and allow the access door to slide closed and lock. If the job is so large that it consumes multiple bins, the process will be repeated with the next part of the job being rotated to the ideal retrieval location. This workflow applies equally well when the input station is the customer's home computer and photos were selected and sent to the printer via an online print website.

In behind-the-counter mode all output bins of the Order Sorter are exposed to the attendant. Because the microprocessor keeps track of the print orders in each bin of the order sorter (using the sensors 78), the printer device can quickly direct an attendant to the bins that contain a given order. Once an order has been requested, such as by scanning a barcode, using the touchscreen 72, or via a linked order management system, or some other data input device, the microprocessor quickly identifies the order, and illuminates the LEDs 69 corresponding to the output bins in which the order is located, and can provide additional identifying information via the display screen. The attendant then only need follow the lights and/or instructions on the display screen to retrieve all associated prints. Additionally, after identifying the bins in which an order resides, the printer device can spin the order sorter wheel 64 to an ideal ergonomic location for retrieval by the attendant.

The integrated use of sensors in all bins and the display enables accurate LED illumination of print jobs present at all locations and helps provide a simple and intuitive customer interface in which all print jobs can be tracked, managed, and indicated via LEDs, the integrated display, and an offline order management application, if present. This system for identifying and retrieving print orders is particularly helpful for inexperienced or distracted store personnel, who are prone to order sorting mistakes.

The order sorter indicator lights 69 and the display 72 can identify print locations and convey additional information to further increase convenience and reduce errors. When a user seeks to retrieve a print order that is contained in multiple sorter bins, the lights on each bin can light up to identify the various bins. The sorter bin that is aligned with the output door can have a flashing light, while other bins that contain prints for the given order can have solid lights until they are later rotated to the output position. In the self-service configuration, the system can then sequentially rotate to place each bin at the location of the output bin 68 in sequence, even where the respective bins for a given order are at different locations on the order sorter wheel.

Other indicator light sequences can be used for other purposes. For example, LEDs can slowly march around the circle as an attention getter to attract potential customers to the printer device in a retail location. In the front-of-counter mode, the number of marching LEDs may correspond to the number of occupied output bins. When nearly all LEDs are illuminated and marching, a part time attendant would be alerted to remove some print jobs in the near future. One light jogging quickly around the hub of the wheel can warn users of wheel movement. Flashing LED's can be used to attract an attendant to a machine error, the need to replace consumables (e.g. photo paper, toner, etc.), to remove the oldest order from the sorter, etc. The indicator lights can also be used to convey information in many additional ways by selectively changing their condition to "On", "Off", "Blinking Slowly", "Blinking Quickly", or illuminated in some coordinated manner. Color LEDs can also be used to provide different information depending upon their color.

This comprehensive system for identifying and retrieving orders from the order sorter of a printing device offers several advantages. The LED indicators clearly identify one specific print job out of perhaps many that are present in the order sorter. The LED indicators can be used to identify all parts of a larger print job that reside in multiple bins. A blinking LED can indicate the oldest print job still in the order sorter, and thereby help an attendant process jobs in a systematic first-in-first-out order if they wish. Clear, real-time instructions can be displayed on the integrated display, including animation of required customer actions, resulting in a simple and satisfying user experience. In behind-the-counter mode, a simple and clear user experience can greatly reduce errors by attendants whose job it is to sort and separate print jobs from many customers. Training time for attendants can thus be reduced because of the low complexity and real-time instructions and indications provided by the system.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. A photo printing device, comprising:
   a microprocessor, operable to receive photo printing data;
   a printer, configured to print photographs from the photo printing data;
   an order sorter, having a plurality of moveable bins for receiving prints from the printer;
   an output door opening adjacent one of the moveable bins identified by a receipt presented by a user, the output door providing the user direct access to the one of the movable bins including the print photographs for the user so that the user can remove the print photographs only from the one of the movable bins identified by the receipt;
   an identifying device, associated with each bin of the order sorter, configured to convey information to a user related to operation of the order sorter; and
   further comprising a registration ring that protrudes into a notch in each of the plurality of moveable bins to justify the print photographs in respective moveable bins while the order sorter turns.

2. The photo printing device of claim 1, wherein the identifying device comprises an indicator light, associated with each bin of the order sorter, and a display, configured to provide graphical indicia, the display and indicator lights being coupled to the microprocessor and configured to together convey order identification information regarding a bin in which prints of a given order are located.

3. The photo printing device of claim 2, wherein the indicator lights are configured to convey information by at least one of changing between an "On" and "Off" condition, blinking slowly, blinking quickly", changing color, and coordinated illumination of multiple indicator lights.

4. The photo printing device of claim 1, wherein the identifying device is configured to convey information selected from the group consisting of instructing a user on use of the printing device, identifying print locations in the order sorter, attracting attention of potential customers, indicating a number of occupied bins in the order sorter, indicating that all bins in the order sorter are occupied, indicating movement of the order sorter, and indicating a service or error condition of the printing device.

5. The photo printing device of claim 1, wherein the output door is a lockable output door, positioned to selectively allow access to prints from a single bin of the order sorter at a time.

6. The photo printing device of claim 5, wherein the lockable output door is disposed in a removable order security door, configured to selectively cover the order sorter.

7. The photo printing device of claim 1, wherein the order sorter comprises a rotational order sorter, having a plurality of bins rotationally disposed around a horizontal axis.

8. The photo printing device of claim 7, further comprising a sensor, disposed each bin of the order sorter, for detecting the presence of prints therein, any selected empty bin being positionable to receive a batch of prints from the printer, regardless of an order in which batches are printed.

9. A photo printing device, comprising:
   a microprocessor, operable to receive photo printing data;
   a printer, configured to print photographs from the photo printing data;
   a rotational order sorter, having a plurality of moveable bins for receiving prints from the printer;
   an output door opening adjacent one of the moveable bins identified by a receipt presented by a user, the output door providing the user direct access to the one of the movable bins including the print photographs for the user so that the user can remove the print photographs only from the one of the movable bins identified by the receipt;
   means for conveying information to a user related to operation of the order sorter; and
   registration means protruding into a notch in each of the plurality of moveable bins for justifying the prints in respective moveable bins while the order sorter rotates.

10. A photo printing device in accordance with claim 9, wherein the means for conveying information to a user comprises indicator lights, associated with each bin of the order sorter, and a graphical display, coupled to the microprocessor, configured to together convey order identification information regarding a bin in which prints of a given order are located.

11. A photo printing device in accordance with claim 10, wherein the indicator lights are configured to convey information by at least one of changing between an "On" and "Off" condition, blinking slowly, blinking quickly", changing color, and coordinated illumination of multiple indicator lights.

12. A photo printing device in accordance with claim 9, further comprising a sensor, disposed each bin of the order sorter, for detecting the presence of prints therein, any selected empty bin being positionable to receive a batch of prints from the printer, regardless of an order in which batches are printed.

13. A method or identifying orders in an order sorter of a photo printing device, a photo printing device performing the steps of the method comprising:
- transferring photo prints of a print order to a selected bin of a moveable order sorter;
- receiving identifying data for the print order;
- moving the selected bin in directly adjacent an output door to provide the user with direct access to the selected bin so that the user can remove the print photographs only from the selected bin;
- registering each of a plurality of moveable bins including the selected bin, to justify the photo prints in respective moveable bins while the movable order sorter turns; and
- actuating an order identifying device to identify the selected bin to a user.

14. The method of claim 13, wherein the step of actuating an order identifying device comprises at least one of illuminating an indicator light adjacent to the selected bin and providing graphical indicia on a display.

15. The method of claim 13, further comprising the photo printing device performing the step of moving the order sorter to place the selected bin adjacent to an output location at which the user can obtain the photo prints.

16. The photo printing device of claim 1, wherein the registration ring keeps the print photographs from catching an edge and getting jammed between the order sorter and a front door.

17. The photo printing device of claim 16, further comprising another registration ring to keep prints from getting stuck between the order sorter and a rear frame.

18. The photo printing device of claim 1, further comprising an escrow bin having substantially the same capacity as each of the moveable bins, and at least one sensor indicating a maximum size for the print photographs for placement into an empty one of the movable bins.

19. The photo printing device of claim 18, wherein the order sorter is bidirectional so that the order sorter can be moved the shortest distance to place a closest empty one of the movable bins in position to receive finished prints directly from the escrow bin.

* * * * *

UNITED STATES PATENT AND TRADEMARK OFFICE
CERTIFICATE OF CORRECTION

PATENT NO.        : 8,208,161 B2                                    Page 1 of 1
APPLICATION NO.   : 12/251737
DATED             : June 26, 2012
INVENTOR(S)       : Craig A LeVier et al.

It is certified that error appears in the above-identified patent and that said Letters Patent is hereby corrected as shown below:

In column 10, line 4, in Claim 3, delete "quickly"," and insert -- quickly, --, therefor.

In column 10, line 59, in Claim 11, delete "quickly"," and insert -- quickly, --, therefor.

In column 11, line 1, in Claim 13, delete "or" and insert -- for --, therefor.

Signed and Sealed this
Fifteenth Day of January, 2013

David J. Kappos
*Director of the United States Patent and Trademark Office*